United States Patent [19]
Roll et al.

[11] Patent Number: 4,891,077
[45] Date of Patent: Jan. 2, 1990

[54] METHOD OF MAKING AN ELECTROMAGNETIC COUPLING DISC

[75] Inventors: Thomas P. Roll, Brighton, Mich.; Dwight E. Booth, Janesville, Wis.

[73] Assignee: Dana Corporation, Toledo, Ohio

[21] Appl. No.: 263,371

[22] Filed: Oct. 27, 1988

[51] Int. Cl.⁴ .............................................. H01F 41/02
[52] U.S. Cl. ................................... 148/9 R; 148/903; 29/607; 219/121.71
[58] Field of Search ................................ 148/9 R, 903; 219/121.71, 121.72, 121.85; 29/607

[56] References Cited

U.S. PATENT DOCUMENTS 3,965,328  6/1976  Locke ............................ 219/121.72
4,685,202  8/1987  Booth et al. ................... 219/121.72

Primary Examiner—Scott Kastler
Attorney, Agent, or Firm—Leydig, Voit & Mayer, Ltd.

[57] ABSTRACT

A method of forming slots in the metal coupling disc (e.g., the armature or rotor) of an electomagnetic coupling such as a clutch or brake. The method is carried out by effecting relative movement between the coupling disc and a laser beam to cause the beam to melt portions of the disc and thereby form slots through the disc. The laser beam is defocused relative to the disc in order to enable a relatively low powered laser beam to form relatively wide slots in the disc. A pressurized jet of gas is directed against the disc immediately adjacent the beam and acts to blast metal from the slots and assist in the formation of wide slots.

4 Claims, 1 Drawing Sheet

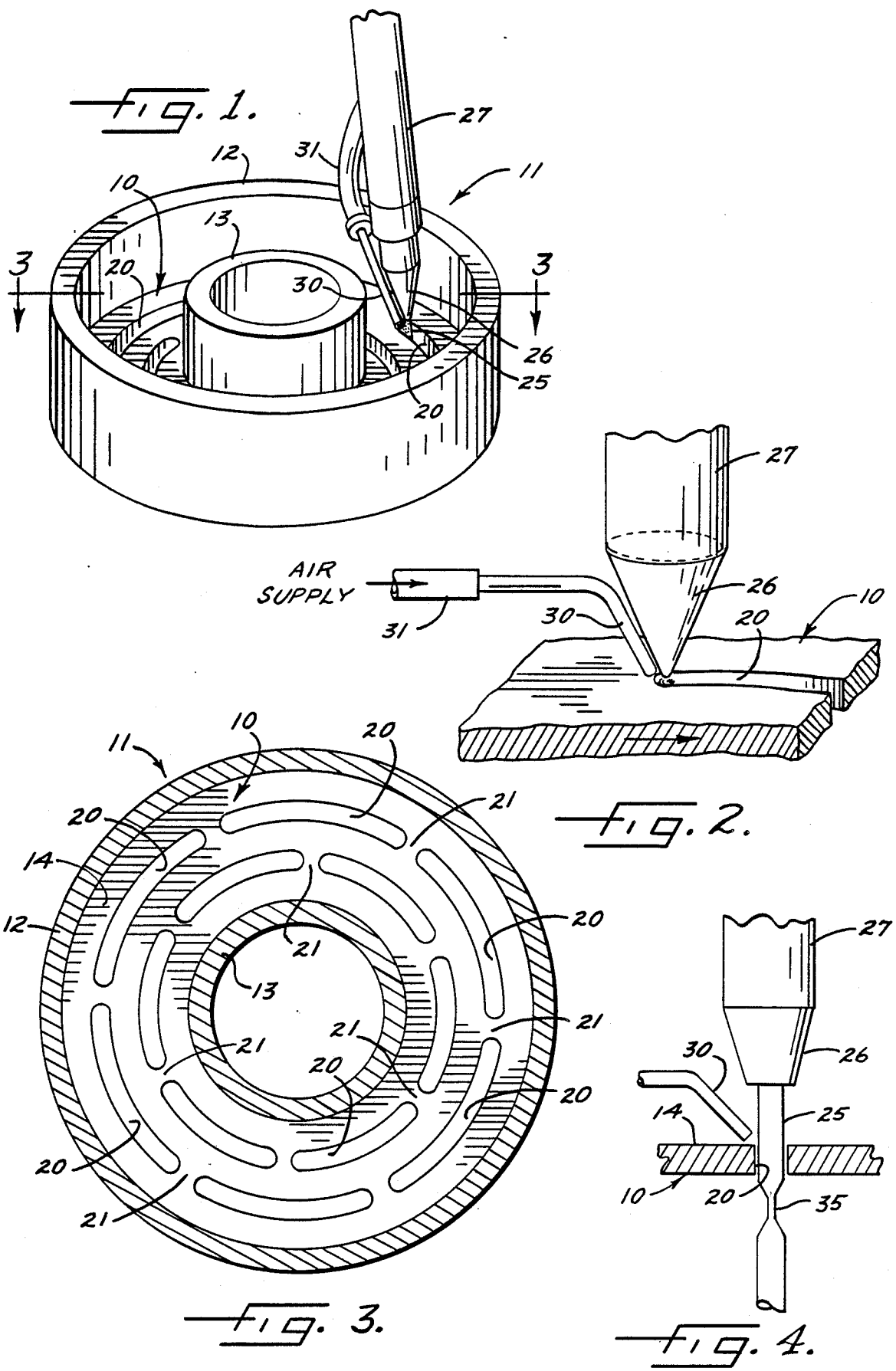

4,891,077

METHOD OF MAKING AN ELECTROMAGNETIC COUPLING DISC

BACKGROUND OF THE INVENTION

This invention relates to a method for forming multiple pole coupling discs of the type used in an electromagnetic coupling such as an electromagnetic clutch or brake. The coupling disc may be part of a rotary or non-rotary field or may be a rotary or non-rotary armature.

A typical electromagnetic coupling is disclosed in Silvestrini et al U.S. Pat. No. 4,187,939 and, in that particular case, the coupling is an electromagnetic clutch having a rotary armature disc made of magnetic material such as steel and having a field with a rotary coupling disc or rotor which also is made of magnetic material. When the coil of the field is excited, magnetic flux threads a path between the rotor and the axially opposing armature and attracts the armature into engagement with the rotor to couple the two for rotation in unison.

In the coupling disclosed in the Silvestrini et al patent, the armature is formed with a ring of angularly spaced "banana" slots while the rotor is formed with two concentric rings of angularly spaced banana slots located on opposite sides of the ring of slots in the armature. The banana slots form high reluctance air gaps causing the rotor and armature to define four magnetic poles which increase the torque of a coupling of given diameter. By forming an additional ring of slots in each of the rotor and armature, the coupling may be constructed as a six-pole coupling with even higher torque capacity.

Until just recently, the banana slots conventionally have been stamped in the rotor and armature. Presently available stamping techniques dictate that, as a general rule, the radial width of the slots cannot be substantially less than the thickness of the disc. As a result, difficulty is encountered in stamping multiple rings of slots in a comparatively thick disc which is relatively small in diameter. In addition, stamping of the slots tends to impose restrictions on the location of the slots in the disc. The design of the disc thus tends to be dictated by tooling considerations rather than magnetic characteristics.

As an alternative to slotting the rotor and armature to form high reluctance air gaps, channels may be machined in the disc and then filled with non-magnetic material to define high reluctance barriers between the poles. Subsequently, the disc is machined to remove the bottoms of the magnetic channels and eliminate the flux leakage paths which otherwise would be created across the bottoms of the channels. This manufacturing process is relatively expensive and becomes even more so when each disc is formed with two or more high reluctance rings.

Formation of the slots in a coupling disc through the use of a laser beam is disclosed in commonly assigned and copending Booth et al U.S. Pat. No. 4,685,202. In the method disclosed in that patent, the laser beam forms continuous slots which are immediately backfilled with non-magnetic material. Alternatively, the method contemplates the formation of angularly spaced banana slots separated by non-magnetic bridges which are formed by backfilling the spaces between the slots with non-magnetic material.

The methods disclosed in the aforementioned Booth et al patent represent remarkable improvements in the art of magnetic coupling discs. Even those methods, however, have some limitations. For example, it is difficult to form slots of any substantial radial width in a single pass and on a high speed production basis without the use of a very powerful laser having a beam of substantial diameter.

SUMMARY OF THE INVENTION

The general aim of the present invention is to provide a new and improved method of forming a magnetic coupling disc through the use of a laser which, while being of comparatively low power, is rendered capable of cutting relatively wide slots in the disc.

A more detailed object of the invention is to achieve the foregoing by defocusing the laser beam relative to the disc in order to form a beam of greater diameter at the disc and by using a pressurized jet of gas to blast metal from the disc and enable a laser beam of a given power density to cut wider slots in the disc.

These and other objects and advantages of the invention will become more apparent from the following detailed description when taken in conjunction with the accompanying drawings.

BRIEF DESCRIPTION OF THE DRAWINGS

FIG. 1 is a perspective view showing a coupling disc being slotted by the method of the present invention.

FIG. 2 is an enlarged fragmentary perspective view of certain parts shown in FIG. 1.

FIG. 3 is an enlarged cross-section taken along the line 3—3 of FIG. 1.

FIG. 4 is a cross-sectional view schematically showing the disc being slotted with a defocused laser beam.

DETAILED DESCRIPTION

The drawings illustrate the methods of the present invention as being used for forming a coupling disc 10 for use in an electromagnetic coupling such as an electromagnetic brake or clutch. While the disc could be an armature, it herein is shown as forming part of a clutch rotor. 11 which may, for example, be of the type disclosed in the aforementioned Silvestrini et al patent. In this particular instance, the rotor is circular in shape and includes an axially extending outer flange 12 and an axially extending inner hub 13 which preferably are integral with one face 14 (FIG. 2) of the disc 10. The opposite face of the disc forms the working face of the rotor 11 and is adapted to frictionally engage the armature of the clutch. As is conventional, the rotor is made of low reluctance magnetic material such as AISI 1010 steel.

For simplicity, the specific rotor 11 which has been illustrated in FIGS. 1 to 4 forms part of a four-pole clutch and thus the disc 10 includes inner and outer concentric barriers 20 which are non-magnetic. In this instance, the non-magnetic barriers are defined by inner and outer radially spaced rows or rings of angularly spaced slots. One magnetic pole is defined by that area of the disc located inside of the inner ring of slots, two poles are defined by the area between the rings, and the fourth pole is defined by the area located outwardly of the outer ring. By providing the disc 10 with a third ring of slots, the rotor 11 may form part of a six-pole clutch.

The slots 20 of each ring are separated from one another by angularly spaced magnetic bridges 21 (FIG. 3) which are left between the slots in order to maintain the structural integrity of the disc 10. Each slot is commonly referred to as being a "banana" slot insofar as each slot is shaped so as to have an elongated and arcuate outer side, an elongated and concentric inner side and two radiused ends.

According to the present invention, the slots 20 are formed in the disc 10 by a laser beam 25 which, while having a relative low power density, is capable of forming relatively wide slots. For this purpose, the laser beam is defocused relative to the disc and a jet of pressurized gas is used in conjunction with the beam. As will become apparent subsequently, the use of the defocused beam and the pressurized jet enables a laser of a given power to form a wider slot than otherwise would be possible.

Herein, the laser beam 25 is directed downwardly by a focusing tip 26 located at the lower end of a laser head 27. The disc 10 and the laser head 27 are adapted to be rotated relative to one another about an axis coinciding with the center of the disc and, in this particular instance, the relative rotation is effected by keeping the laser head fixed in space and by rotating the rotor 11 about its own axis. It will be understood, of course, that the rotor could be held in a fixed position and that the laser head could be traversed in a circular path about the axis of the rotor.

The tip 26 focuses the beam 25 such that, at its focal point 35 of narrowest cross-section, the diameter of the beam is on the order of between 0.010" and 0.020". It is at this area of narrow cross-section where the power density of the laser beam is greatest, the power density of a typical laser being about $10^7$ watts/in$^2$. At this power density level and with the focal point 35 located in the plane of the disc 10, the beam is capable of quickly cutting low carbon steel but, on a single pass, can cut slots having only a relatively narrow width on the order of between 0.010" and 0.020".

In keeping with the invention, the beam 25 is defocused relative to the disc 10 by either lowering the laser tip 26 relative to the disc or by raising the disc relative to the laser tip. In either case, the focal point 35 or area of smallest diameter of the beam is lowered into or below the plane of the disc as shown in FIG. 4 while the diameter of the beam where the beam first strikes the face 14 of the disc is increased substantially. Such increase reduces the power density of the beam at the face 14 of the disc but the use of the pressurized jet of gas compensates for the reduction.

As shown in FIG. 2, the pressurized jet of gas is directed onto the disc 10 through a nozzle 30. The gas is delivered under pressure to the nozzle through a hose 31 while the nozzle directs the gas against an area of the disc immediately adjacent the area swept by the beam 25. The pressurized jet blasts the molten metal from the slots 20 and thus enables the defocused beam to effectively cut a wide slot. For example, the use of a jet of air with a defocused beam having a power density of $10^5$ watts/in$^2$ enables the cutting of slots having a width up to 0.075".

If an oxygen jet is used instead of an air jet, the oxygen reacts with the steel of the disc and causes the steel to melt at a higher rate than would be possible through the use of the beam alone. This enables the laser to form relatively wide slots at a relatively high speed. Using oxygen as the assist gas, slots having a width up to 0.200" can be cut on a single pass but the edges of the slots are somewhat rougher than the edges of the slots formed when air is used as the assist gas.

We claim:

1. A method of forming a multiple pole coupling disc for an electromagnetic coupling, said method comprising the steps of, providing a disc made of magnetic material, directing a laser beam toward one face of said disc at a location between the center of the disc and the outer periphery thereof, causing said laser beam to strike said disc at a point spaced from the focal point of the laser beam whereby said beam is defocused relative to said disc, effecting relative turning between said disc and said laser beam to cause said defocused laser beam to melt portions of said disc and form relatively wide curved slot means in the disc, and injecting a jet of pressurized gas against said disc during formation of said slot means, said jet being closely adjacent to said laser beam.

2. A method as defined in claim 1 in which said gas is air which blasts said material out of said slot means as said slot means are formed by said laser beam.

3. A method as defined in claim 1 in which said gas is oxygen and reacts with said material to help melt said disc, said oxygen blasting said material out of said slot means as said slot means are formed by said laser beam.

4. A method as defined in claim 1 in which said laser beam is fixed in space, said relative turning being effected by rotating said disc about an axis extending through the center of the disc and extending perpendicular to said one face of said disc.

* * * * *